US007716141B2

(12) United States Patent
Stewart et al.

(10) Patent No.: US 7,716,141 B2
(45) Date of Patent: May 11, 2010

(54) METHOD FOR PROVIDING AN INDUSTRY REPORT

(75) Inventors: John Robert Stewart, Elizabeth, NJ (US); Douglas LaBahn, Newport Beach, CA (US)

(73) Assignee: Dun and Bradstreet Corporation, Short Hills, NJ (US)

(*) Notice: Subject to any disclaimer, the term of this patent is extended or adjusted under 35 U.S.C. 154(b) by 1680 days.

(21) Appl. No.: 10/371,885

(22) Filed: Feb. 21, 2003

(65) Prior Publication Data

US 2004/0010435 A1    Jan. 15, 2004

Related U.S. Application Data

(60) Provisional application No. 60/358,918, filed on Feb. 22, 2002.

(51) Int. Cl.
  *G06Q 10/00*    (2006.01)
(52) U.S. Cl. .................................. 705/342; 705/1.1
(58) Field of Classification Search .................. 705/1
   See application file for complete search history.

(56) References Cited

U.S. PATENT DOCUMENTS

| | | | | |
|---|---|---|---|---|
| 5,692,181 | A * | 11/1997 | Anand et al. | 707/102 |
| 5,864,871 | A * | 1/1999 | Kitain et al. | 707/104.1 |
| 5,890,137 | A * | 3/1999 | Koreeda | 705/26 |
| 6,078,924 | A * | 6/2000 | Ainsbury et al. | 707/101 |
| 6,421,683 | B1 * | 7/2002 | Lamburt | 707/104.1 |
| 6,453,317 | B1 * | 9/2002 | LaCost et al. | 707/10 |
| 2002/0156702 | A1 * | 10/2002 | Kane | 705/27 |

OTHER PUBLICATIONS

Hoover's Online (documented by the Internet Archive from Feb. 3, 1999 at http://web/archive.org/web/19990203135207/www.hoovers.com/custom_sub.html).*
InfoUSA.com (documented by the Internet Archive from May 11, 2000 at http://web/archive.org/web/20000511153019/kickapoo.infousa.com/ab_iusa/15ways/1,1060...).*
IBIS World New Features (documented by the Internet Archive from Nov. 4, 1999 at http://web.archive.org/web/19991104130915/203.16.173.101/features.htm.*
Hoover's Online—Aerospace/Defense (documented from Oct. 2, 2000 at http://web.archive.org/web/20001002131419/hoovers.com/industry/siccodes/0,2519,2320,0...).*

(Continued)

*Primary Examiner*—John G Weiss
*Assistant Examiner*—Gabrielle McCormick
(74) *Attorney, Agent, or Firm*—Ohlandt, Greeley, Ruggiero & Perle, L.L.P.

(57) ABSTRACT

A method for providing business information comprises receiving a request, a selected industry, and a selected region, then generating report data, and providing a printable industry report. The industry report has charts and a map and is divided into a national market overview section, a market dynamics section, and a company information section. A system for providing business information has an application server, a web server, and a memory, such as a database. The application server fabricates a data product. The web server processes requests from the application server and provides the data product in an industry report. The web server includes charting and mapping components. For rapid retrieval, the database stores a table of company information.

1 Claim, 13 Drawing Sheets

OTHER PUBLICATIONS

Business Wire. "MetaCube Transforms Relational Databases into High-Performance, Multi-Dimensional OLAP Servers". Feb. 14, 1995.*

Montalbano, Elizabeth and Darryl K Taft. "Microsoft's XML gamble". CRN. Jericho: Feb. 5, 2001. Iss. 931; p. 32.*

Hoover's Online—AAR Corp. Industry Information (documented by the Internet Archive from Jun. 12, 2000 at http://web.archive.org/web/20000612105254/hoovers.com/co/industry/7/0,2662,10007,00.h...).*

IBISWorld (documented by the Internet Archive from Jun. 7, 2000 at http://web.archive.org/web/20000607200149/203.89.235.43/).*

Hoover's Industries (documented by the Internet Archive from Oct. 19, 2000 at . http://web/archive.org/web/20001019093357/www.hoovers.com/industry/list/0,2216,78,00...).*

"The Information and Content Exchange (ICE) Protocol". W3C Note Oct. 26, 1998 from http://www.w3.org/TR/NOTE-ice.*

* cited by examiner

Small Business Solutions            Industry Report

Pet and Pet Supplies
United States                Report as of: January 21, 2002
Market Dynamics | Top 25 Companies United States - Top 25 Companies' Market Dynamics Risk of Late Payment           Sales Versus Last 3 Years 1. Business Name 1
   - Address     CEO Name     Total Sales
   - Phone       President Name     Date Started
   -              SVP Name     No. Employees
2. Business Name 2
   - Address     CEO Name     Total Sales
   - Phone       President Name     Date Started
   -              SVP Name     No. Employees
3. Business Name 3
   - Address     CEO Name     Total Sales
   - Phone       President Name     Date Started
   -              SVP Name     No. Employees
4. Business Name 4
   - Address     CEO Name     Total Sales
   - Phone       President Name     Date Started
   -              SVP Name     No. Employees
5. Business Name 5
   - Address     CEO Name     Total Sales
   - Phone       President Name     Date Started
   -              SVP Name     No. Employees
6. Business Name 6
   - Address     CEO Name     Total Sales
   - Phone       President Name     Date Started
   -              SVP Name     No. Employees

–
   –
   –

25. Business Name 25
    - Address     CEO Name     Total Sales
    - Phone       President Name     Date Started
    -              SVP Name     No. Employees

Fig. 10

METHOD FOR PROVIDING AN INDUSTRY REPORT

CROSS REFERENCE

This application claims priority of U.S. Provisional Patent Application Ser. No. 60/358,918, filed on Feb. 22, 2002.

BACKGROUND

1. Field of the Invention

The present invention relates to systems and methods for providing a business information service, and more particularly, to providing an industry report.

2. Description of the Related Art

Small businesses frequently need to know if entering a specific market is a wise or risky proposition. They focus on sales and opportunity analysis. However, it is often difficult for small businesses to get the information they need. Conventional sources of gathering information are too slow. Some reports do not present information in an appealing manner and many do not cover the appropriate geographical regions. There is a need for a visually appealing industry report for small businesses that generates immediate impact and interest.

The industry report according to the present invention overcomes the disadvantages of conventional reports and quickly identifies the top players in the industry within particular geographic regions. The present invention provides a unique report that can be used to:

Analyze a specific industry

Find potential new customers

Find suppliers for goods and services

Identify competitors

Compare my business to an industry

The report according to the present invention is delivered in real-time with no more than 20 seconds required to retrieve and format the data for the report. The present invention also provides a report comprising graphical interfaces, which provide for the dynamic generation and streaming of charts and maps directly to the operator's browser. The reports according to the present invention are uniquely downloadable in a printable HTML version for easy printing.

SUMMARY

A method of providing business information via an industry report, wherein user inputs are sent to a central processing unit (CPU). The user inputs comprising a request, a selected industry, and/or a selected region are received by a CPU. Then, report data is generated and an industry report is produced that includes the report data for the selected industry and the selected region. There may be a purchase confirmation before the report is provided and the industry report may be stored for later retrieval. The industry report may have one or more charts showing the concentration of sales across an industry, company ages, risk of late payment, or sales over a period of time, such as the last three years. In addition, the industry report may include a map indicating a company location and ordered company information for a predetermined number of companies. This ordered company information may include a company name, an address, a phone number, at least one contact name, sales information, a date started, and a total number of employees. The industry report may be organized into three sections: a national market overview section, a market dynamics section, and a company information section.

Another embodiment of the present invention is a system for providing business information. The system comprises an application server, a web server, and a memory. The application server fabricates a data product. The web server processes requests from the application server and provides the data product in an industry report. Two web servers may be used in place of one so that the first web server processes requests from the application server and the second web server retrieves the fabricated data product from the memory and provides it in the industry report. In addition, the first web server may have a charting component and a mapping component. The memory provides data to the web server and stores the fabricated data product. The memory may be one or more databases. Two memories may be used in place of one so that the first memory provides data to the web server and the second memory stores the fabricated data product. For rapid retrieval, the memory may store a table of a predetermined number of companies clustered by annual sales.

These and other features, aspects, and advantages of the present invention will become better understood with reference to the drawings, description, and claims.

BRIEF DESCRIPTION OF THE DRAWINGS

FIG. 10 is a screen layout of another example industry report produced by the method of FIG. 1.

DESCRIPTION OF THE PREFERRED EMBODIMENT

In the following detailed description, reference is made to the accompanying drawings. These drawings form a part of this specification and show by way of example specific preferred embodiments in which the present invention may be practiced. These embodiments are described in sufficient detail to enable those skilled in the art to practice the present invention. Other embodiments may be used and structural, logical, and electrical changes may be made without departing from the spirit and scope of the present invention. Therefore, the following detailed description is not to be taken in a limiting sense and the scope of the present invention is defined only by the appended claims.

The present invention is directed to a method of providing business information in an industry report. This innovative new product provides users with an overview of an industry at the national, regional, state, or metro-area level. It provides sales information, number of companies, number of employees, and credit risk data. This report is visually appealing and grabs users, generating immediate impact and interest.

The industry report is targeted at two main functions, sales and opportunity analysis. The industry report enables small business owners with sales responsibilities to quickly identify the top players in an industry within a geographic region. The industry report is useful in analyzing an industry to determine if entering a market is a wise or a risky proposition.

The industry report is delivered in near real-time, with no more than about 20 seconds required to retrieve and format the data for display. Graphic elements, including charts and a map are dynamically generated and streamed to a user's browser. The industry report is printable and provided in HTML.

Selecting an industry report may be done from a company information screen that allows the user to search for a desired industry. The industry report may be stored by the user for later use or updating. For example, the user may store it in "Tracking Folders" or "My Lists and Reports." In addition, the user may save the industry report on a local disk via the "Save As" function on the user's browser.

Figure 1:
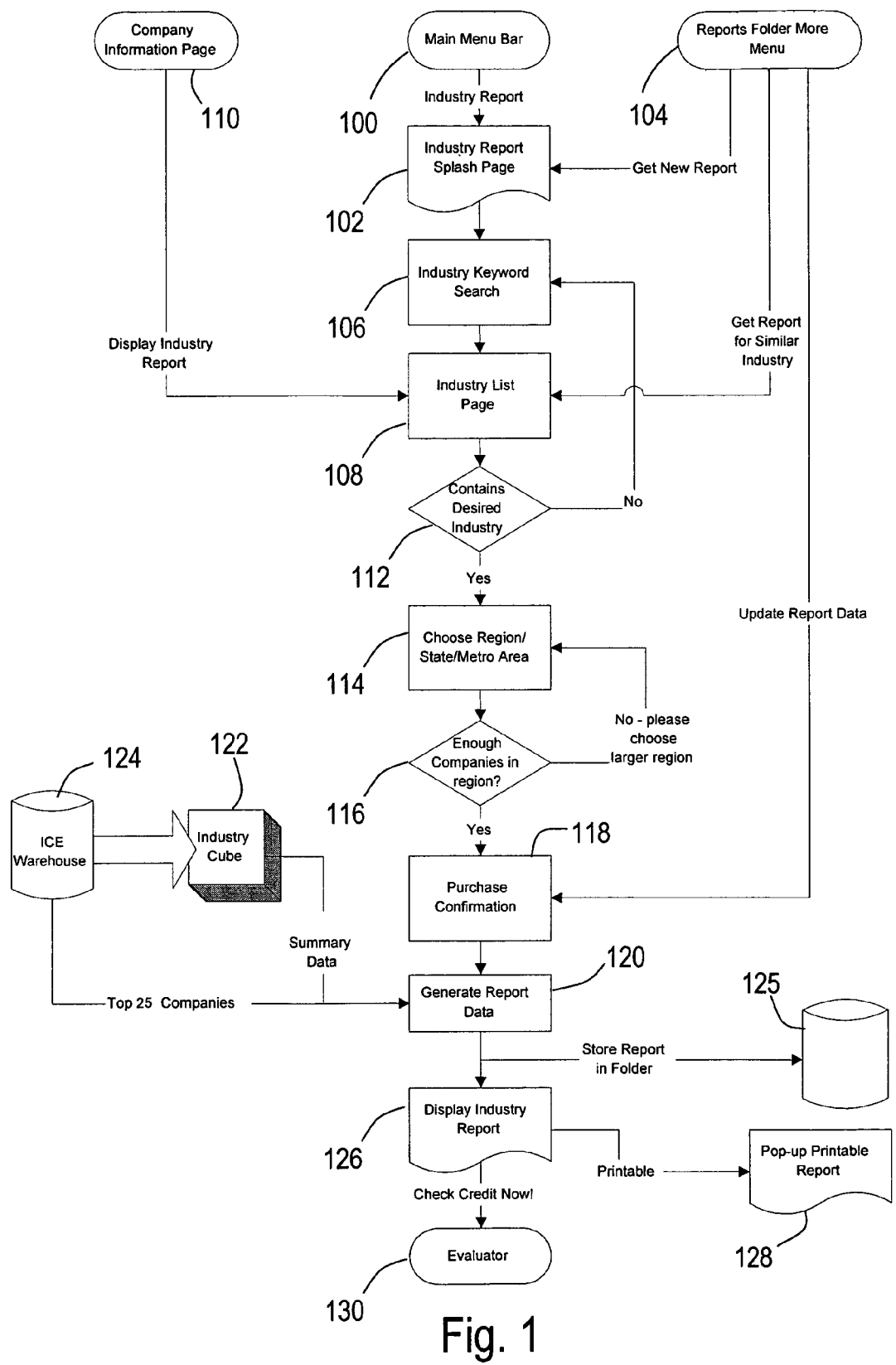
FIG. 1 is a flow chart of an embodiment of a method of producing an industry report according to the present invention.

FIG. 1 shows a method of producing an industry report. In this example, the user selects the industry report from a "Main Menu Bar" 100 and then goes to an "Industry Report Splash Page" 102. Alternately, the user selects "Get New Report" from a "Reports Folder More Menu" 104 and then goes to "Industry Report Splash Page" 102. From "Industry Report Splash Page" 102, the user does an industry keyword search 106. This brings up a "Industry List Page" 108. Alternately, the user may arrive at "Industry List Page" 108 by choosing to display an industry report from a "Company Information Page" 110 or by choosing to get a report for a similar industry from "Reports Folder More Menu" 104. From "Industry List Page" 108, there is a decision branch on whether it contains the desired industry 112. If not, control flows back to where the user can do another industry keyword search 106. Otherwise, the user chooses a region, state, or metro area 114.

Once the user makes a selection, there is a decision on whether there are enough companies in the region based on a predetermined threshold 116. If not, control flows back to allow the user to make another region, state, or metro area selection 114. Otherwise, the user makes a purchase confirmation 118. Alternately, the user may make purchase confirmation 118 after choosing to update report data from "Reports Folder More Menu" 104.

After purchase confirmation 118, report data is generated 120 by receiving summary data from an industry cube 122, which is created from an information and content exchange (ICE) warehouse 124, and by receiving data on a select number of companies, for example the top 25, from ICE warehouse 124. A cube is an aggregation of data from a data warehouse. ICE is a protocol for use by content syndicators and their subscribers and it is available as a W3Note dated Oct. 26, 1998. After report data is generated 120, the industry report is stored in a folder in a data store 125. Then, the industry report is displayed 126 along with a pop-up printable report 128. At this point, credit is checked at an evaluator 130.

Figure 2:
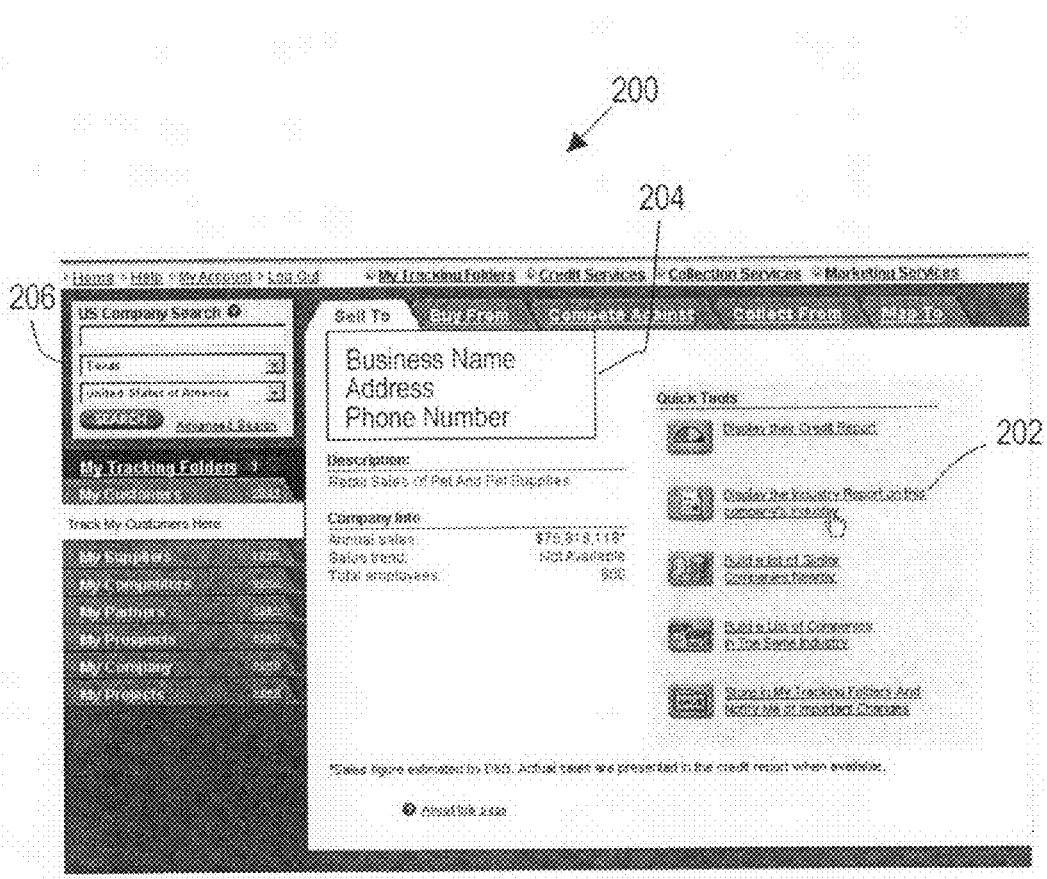
FIG. 2 is a screen layout of an example company information screen for an embodiment of a user interface for the method of FIG. 1.

FIG. 2 shows an example company information screen 200. Company information screen 200 has a link to a screen for displaying an industry report 202 associated with the currently displayed company 204. An instant registration icon 206 remains on company information screen 200 for users who are not logged-in.

Figure 3:
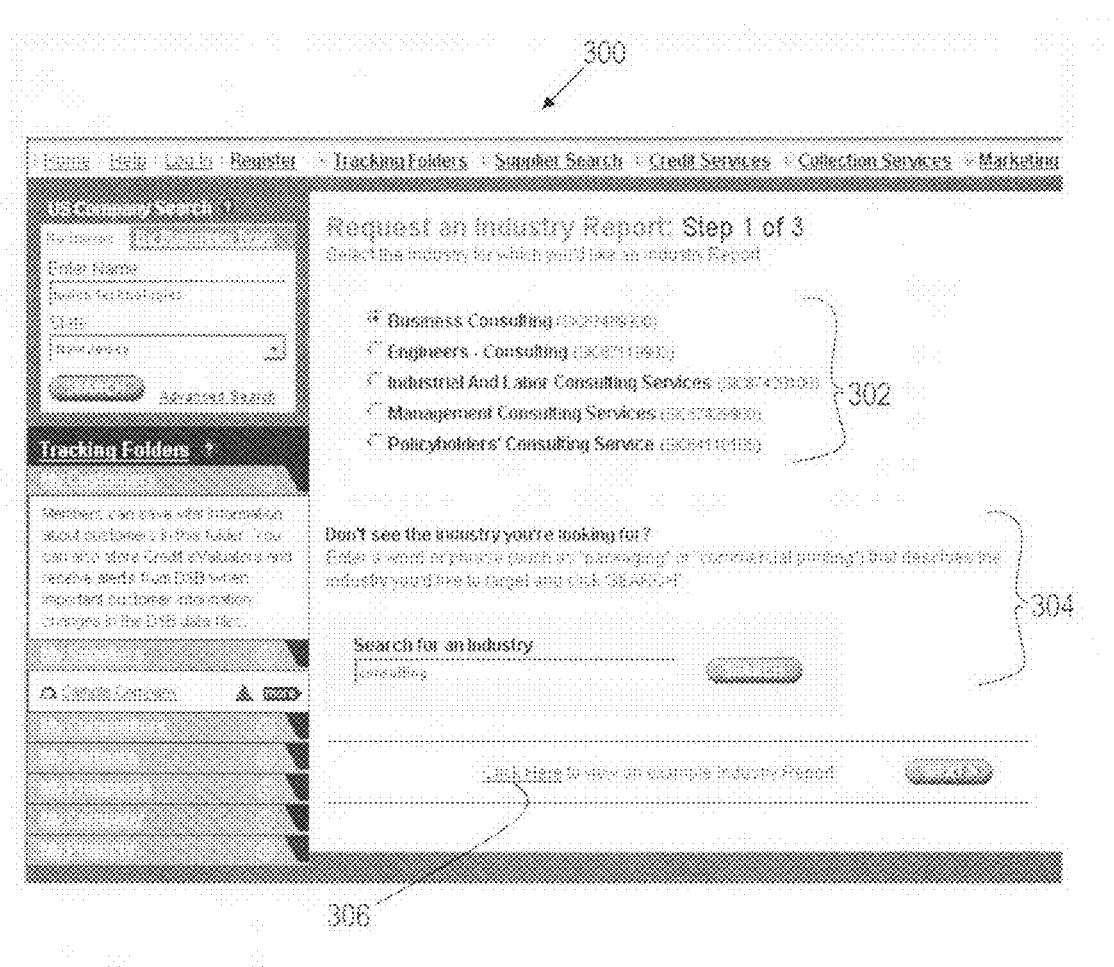
FIG. 3 is a screen layout of an example industry selection screen for an embodiment of a user interface for the method of FIG. 1.

FIG. 3 shows an example industry selection screen 300. Industry selection screen 300 has an example list 302 of industry names and their associated standard industrial classification (SIC) numbers. For the purpose of classifying companies with an industry code, only the primary SIC field is used and only the 8-digit SIC code is used. A search function 304 is provided so that the user may search for an industry. In addition, a link to an example industry report 306 is provided. Industry selection screen 300 is the first of three steps for requesting an industry report, in this example.

Figure 4:
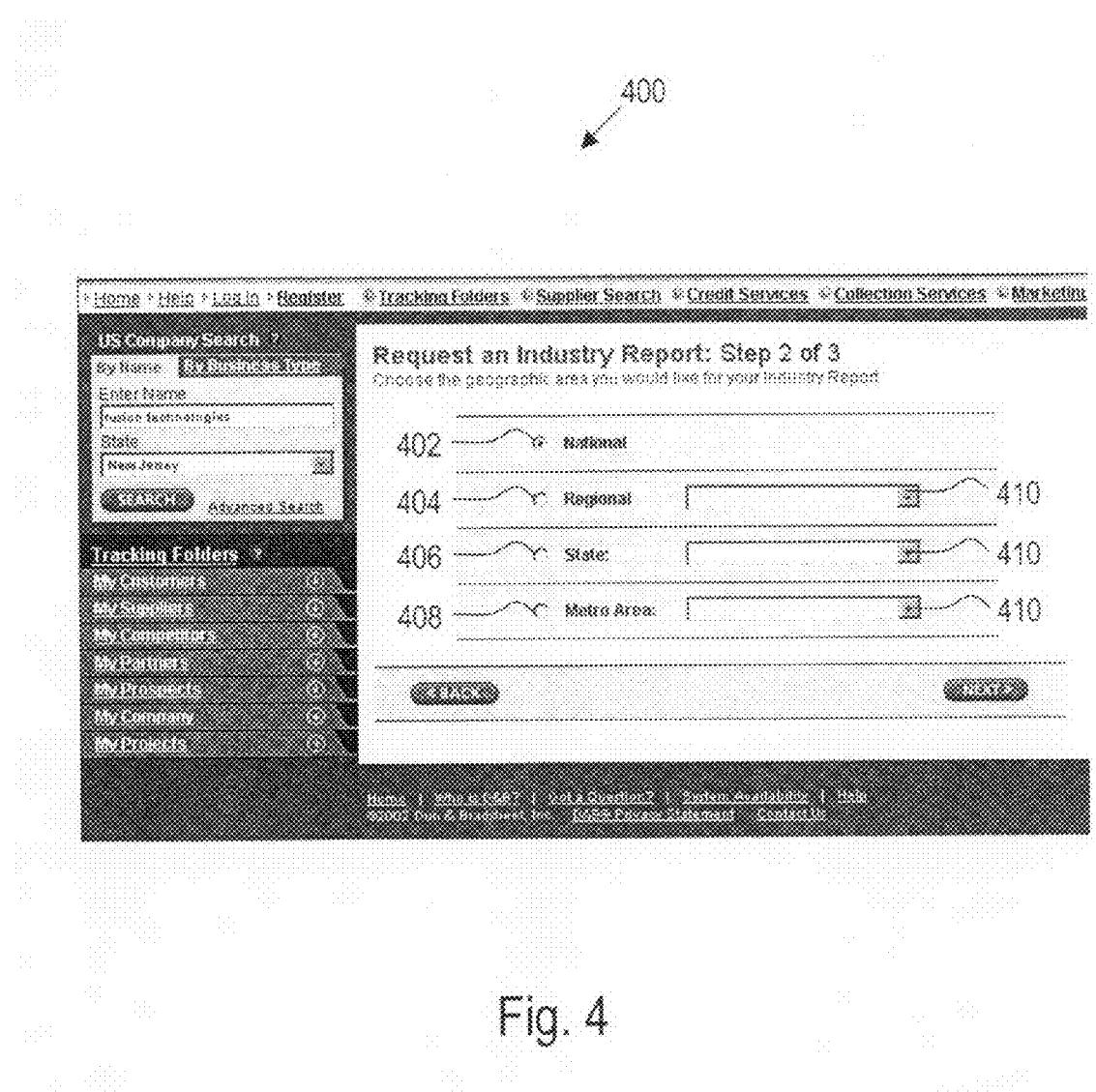
FIG. 4 is a screen layout of an example region selection screen for an embodiment of a user interface for the method of FIG. 1.

FIG. 4 shows an example region selection screen 400. Region selection screen 400 is the second of three steps for requesting an industry report. The region selection may mirror existing user interface selections or be similar to other standard user interfaces, such as the user interface in Microsoft® Word for selecting what to print. In this example, a top radial button is for national 402, a next radial button selects regional 404, a second to last radial button selects state 406, and a last radial button selects metro area 408. The regional, state, and metro selections have a drop down menu 410 that displays a list of regions, such as those listed in Tables 1 and 2.

TABLE 1

Small Business Solutions (SBS) Marketing List Regions

| | |
|---|---|
| NorthEast | South Central |
| Mid-Atlantic | NorthWest |
| SouthEast | SouthWest |
| North Central | Far Pacific |

TABLE 2

Common Regions

Mid-Atlantic
Central
South East
North West
South East

Figure 5:
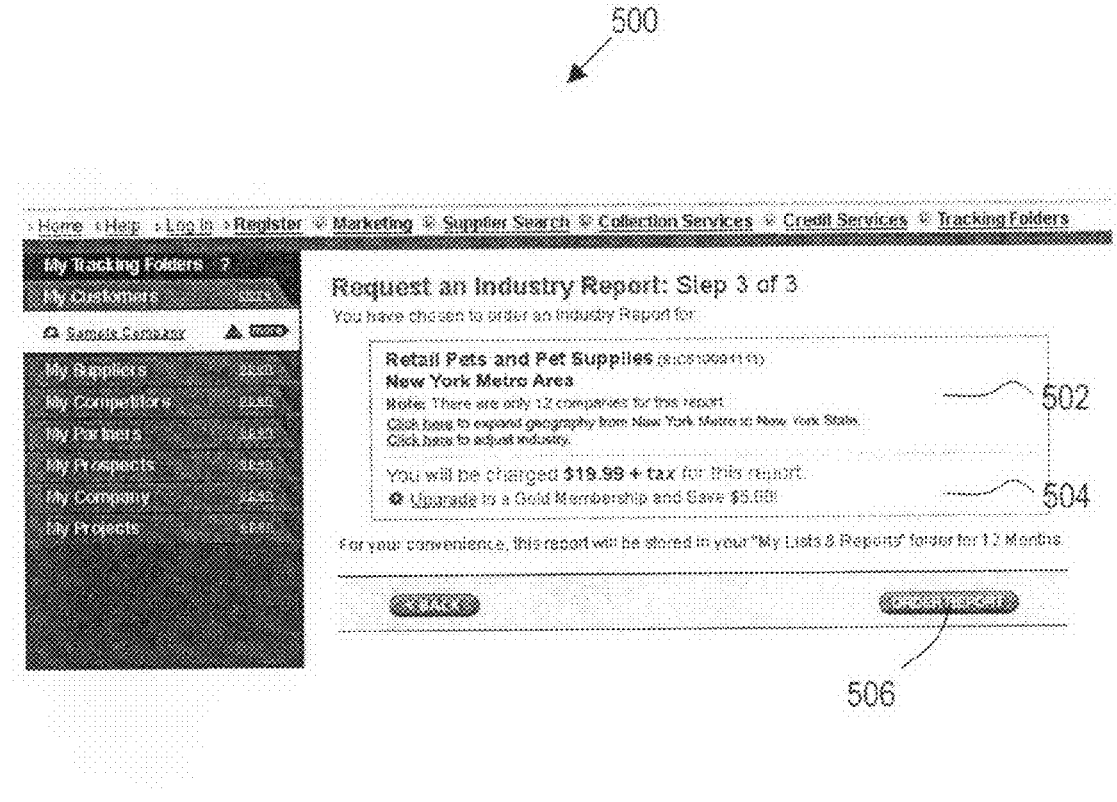
FIG. 5 is a screen layout of an example purchase confirmation screen for an embodiment of a user interface for the method of FIG. 1.

FIG. 5 shows an example purchase confirmation screen 500. Purchase confirmation 500 is the last of three steps for requesting an industry report. Information is displayed about the selected report 502, its price 504, and how to order the report 506 such as by using a button.

Figure 6:
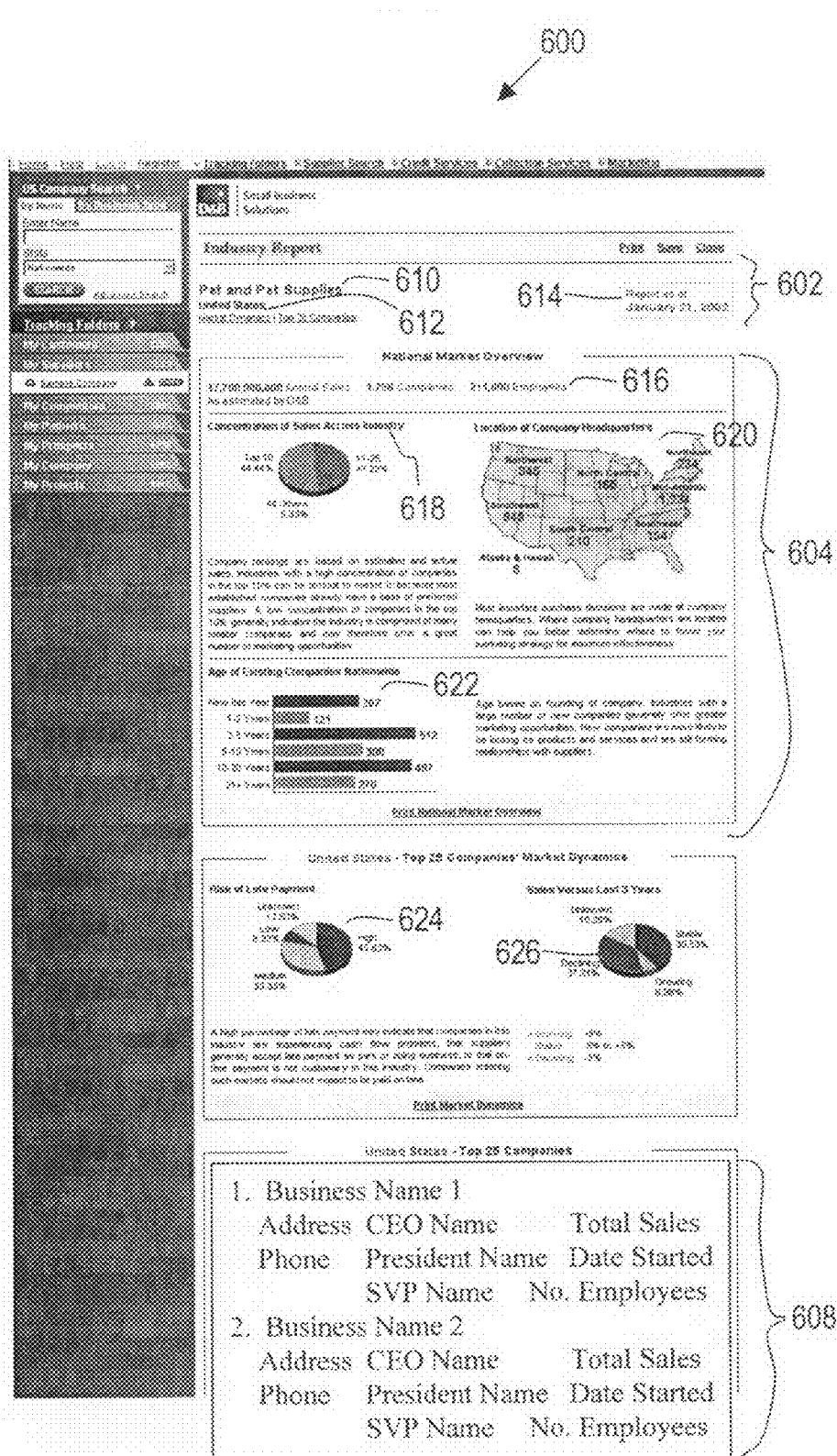
FIG. 6 is a screen layout of an example industry report produced by the method of FIG. 1.

FIG. 6 shows an example industry report 600. Industry report 600 may be displayed on one or more pages and has four main parts, i.e., a heading 602, a market overview section 604, a market dynamics section 606, and a company information section 608. Heading 602 has an industry name 610, region 612, and date 614. Market overview section 604 has general information 616, a concentration of sales across the industry 618 with descriptive text, a map of the location of company headquarters 620 with descriptive text, and ages of existing companies nationwide 622 with descriptive text. Branch locations may be excluded from the report data, using only headquarters and single locations. Market dynamics section 606 has a risk of late payment 624 and sales over a period of time 626, such as three years with descriptive text. Company information section 608 has an ordered list of selected businesses, such as the top 25, with name, address, phone, contact names, total sales, date started, and number of employees for each company. Financial data and number of employees are rolled up to the headquarters location. In addition, yellow page listings may be included.

Some pieces of the industry report are calculated at the national level, while others are specific to the selected geographic region. All data is specific to the selected industry. Table 3 shows some additional information about the example data fields in the industry report.

TABLE 3

Example Data Fields

| Report Element | National/ Specific Geographic level | Data Source | Comment |
|---|---|---|---|
| Annual Sales Total | National | OLAP - sum of annual_sales_us | |
| Count of companies | National | OLAP count of uniq_site | |
| # of Employees | National | OLAP sum emp_total | |
| Headquarters location map | National | OLAP count of uniq_site with location type of HQ | |
| Top 25 company list | Specific | Relational database. Top 25 companies based on annual_sales_us. Return list will need to include 3 contact names, sales, address information, 3 yr. sales trend, and credit score. | For performance, may need new SBO table (or extend competitors table) with SIC, geo codes, country, clustered on annual sales descending. |
| Annual Sales | Specific | OLAP sum of annual_sales_us | |
| Sales concentration | Specific | Calculated | Using Top 25 list, sum sales of 1-10, 11-25. Subtract from region annual sales for "others" |
| Sales trend graph | Specific | Calculated | Using Top 25 list, count number in list with 3 yr. sales trend figures in ranges <−5%, −5 to +5%, >+5%. |
| Risk of late payment graph | Specific | Calculated | Using Top 25 list, count number in list with credit score in certain range. Original specification request previous year vs. current year. Previous year sales figures are not currently available in marketing database. Suggestion is to use 3 year sales trend figure. |
| Age of existing companies graph | Specific | OLAP cube. Count of uniq_site by age_rng_cd. | |

Figure 7:
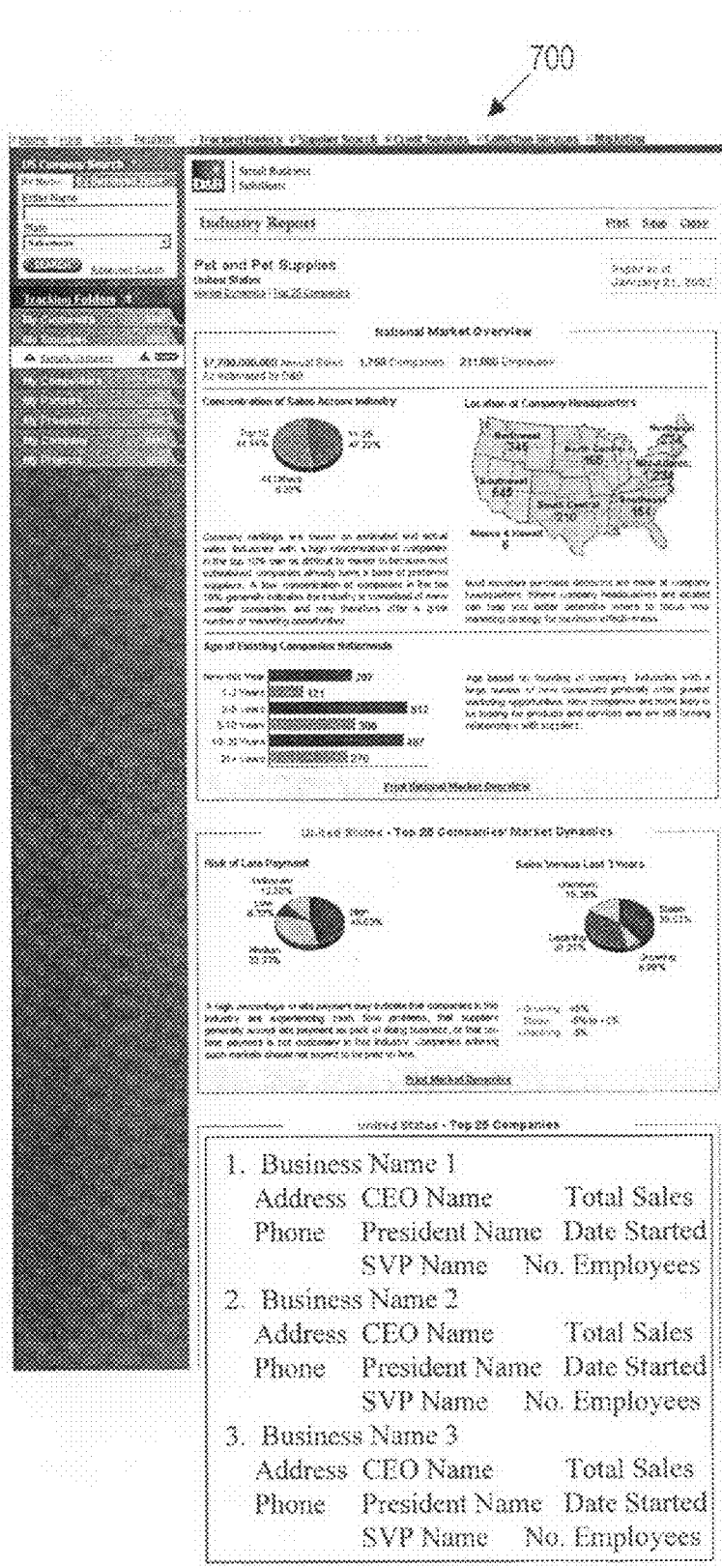
FIG. 7 is a screen layout of another example industry report produced by the method of FIG. 1.
Figure 8:
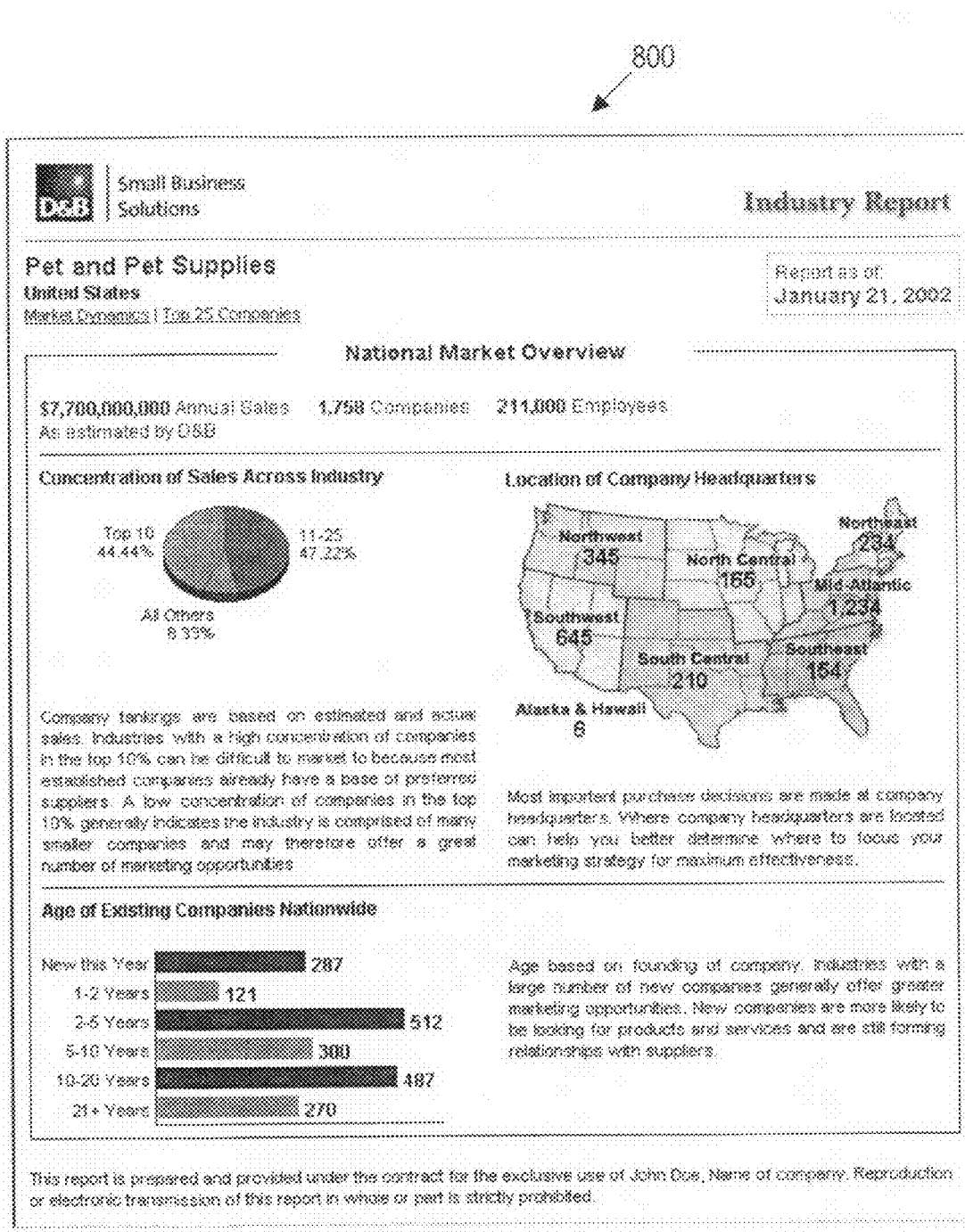
FIG. 8 is a screen layout of another example industry report produced by the method of FIG. 1.
Figure 9:
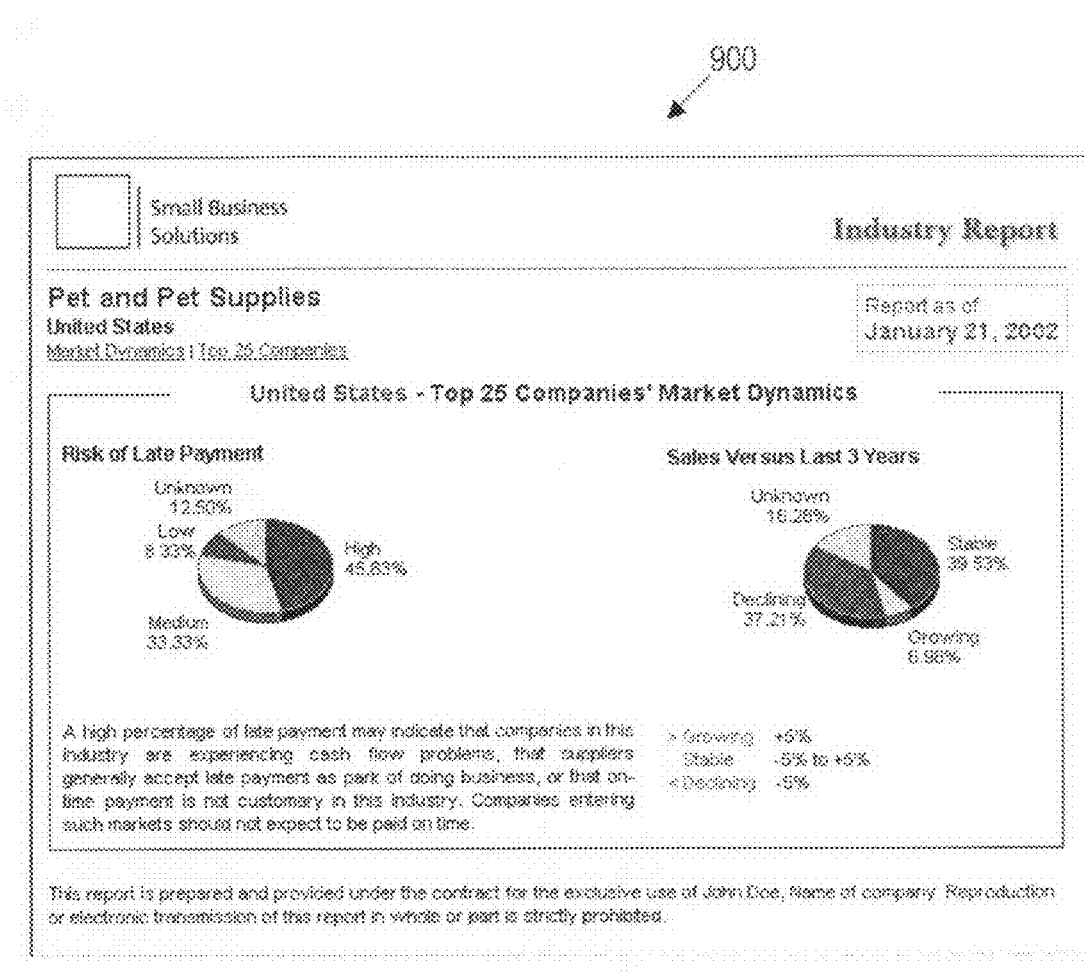
FIG. 9 is a screen layout of another example industry report produced by the method of FIG. 1.

FIGS. 7-10 show that industry report 600 is printable in its entirety or by section. FIG. 7 shows another example industry report 700, which is the entire printable report as shown in FIG. 6, but without the browser frame, search icon, folders, and border. FIG. 8 shows another example industry report 800, which is the printable market overview section 604 of FIG. 6. FIG. 9 shows another example industry report 900, which is the printable market dynamics section 606 of FIG. 6. FIG. 10 shows another example industry report 1000, which is the printable company information section 608 of FIG. 6.

Figure 11:
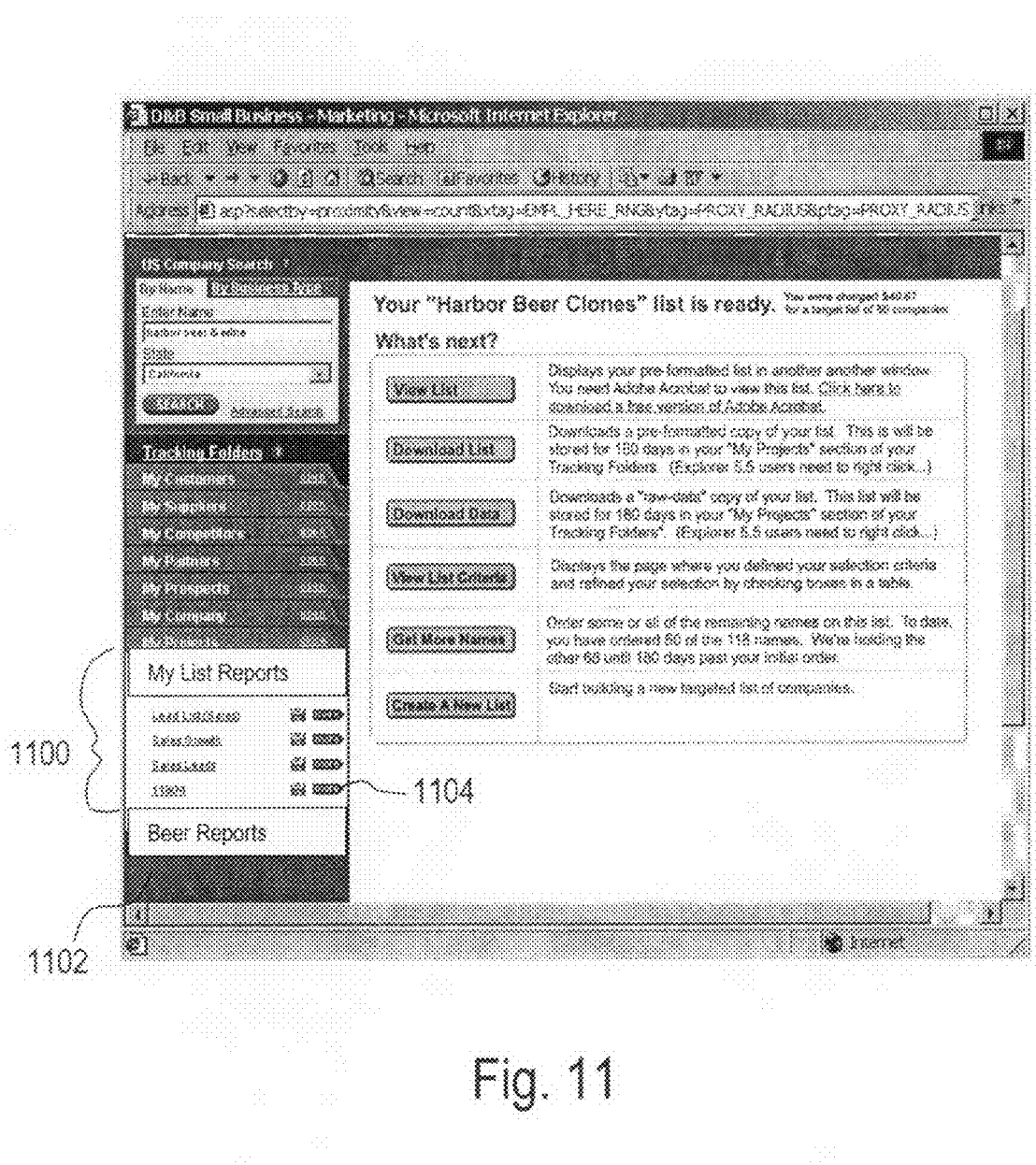
FIG. 11 is a screen layout of an example "My Lists and Reports" folder for an embodiment of a user interface for the method of FIG. 1.

FIG. 11 shows an example folder entitled "My Lists and Reports" 1100. "My Lists and Reports" 1100 shows a "Beer Report" 1102, which is a previously created industry report. Next to the "Beer Report" 1102 is a "More" button 1104. When the user selects the "More" button 1104, the report data will be updated as shown in FIG. 1 on the flow line between "Reports Folder More Menu" 104 and purchase confirmation 118. Alternately, the user could get a report for a similar industry (flow line between "Reports Folder More Menu" 104 and "Industry List Page" 108 in FIG. 1) or get a new report (flow line between "Reports Folder More Menu" 104 and "Industry Report Splash Page" 102 in FIG. 1).

Figure 12:
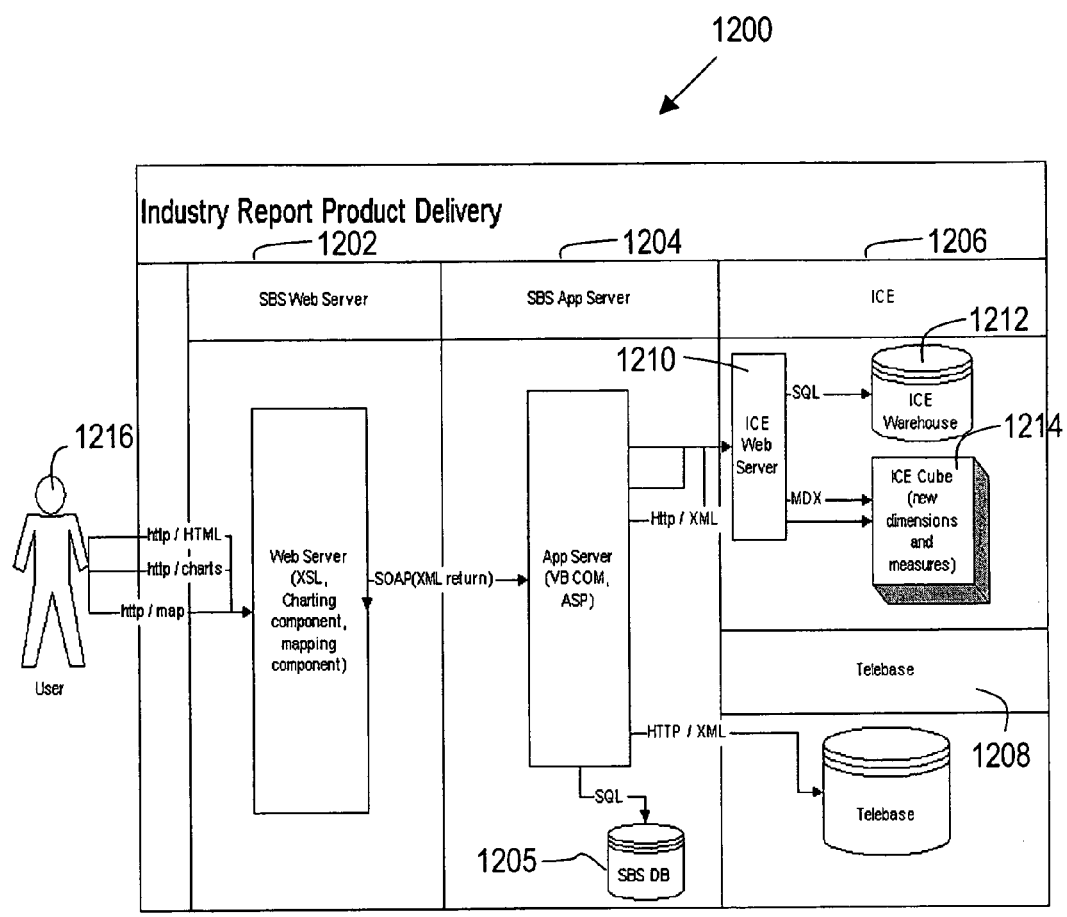
FIG. 12 is a block diagram of an embodiment of a system architecture for practicing the method of FIG. 1.

FIG. 12 shows a system 1200, which may be part of a larger system. System 1200 includes a web server 1202, an application server 1204, an information content and exchange (ICE) component 1206, and a database 1208. Web server 1202 and application server 1204 may be used for other small business solution (SBS) functionality. Application server 1204 includes a database 1205. ICE component 1206 includes an ICE server 1210, an ICE warehouse 1212, and an ICE cube 1214. Ice cube 1214 may be an online analytical processing (OLAP) cube. ICE component 1206 uses structured query language (SQL) and multidimensional expression language (MDX). ICE warehouse 1212 may have an optimized table for a selected number of companies such as the top 25, clustered by annual sales, descending, with region and SIC selectors in the table. Additional fields, such as a top three contacts, sales trend, and credit score may be included in the table or a join to a site may be made. In this example, database 1208 is Telebase, an online information service available from D&B in King of Prussia, Pa.

System 1200 is involved in fabricating and delivering an industry report product to a user 1216. Data content in extensible markup language (XML) for the industry report is fabricated on application server 1204. Application server 1204 makes multiple synchronous XML calls over hypertext transfer protocol (HTTP) to web server 1202. Simple object access protocol (SOAP) communication may be used for XML and HTTP. Each request provides a block of data from either ICE warehouse 1212 or ICE cube 1214. The separate data blocks are collated by application server 1204 and returned as a product packet to web server 1202, after charging is complete. Alternatively, ICE component 1206 may fabricate the complete data product or web server 1202 may collate multiple requests from ICE component 1206.

The data product is stored in database 1205 as item content for later redelivery and may be stored as XML. A storage device for report content may be created to separate data content from operational data. Web server 1202 may retrieve the data product multiple times if the industry report is multiple pages long with a printable version. In addition, if user 1216 reviews the industry report at a later date, system 1200 returns the same data as in the originally sold industry report, not a version based on possibly newer data. Alternatively, free updates may be offered to the user as data is refreshed. There may be various lifetime and purging rules associated with data storage.

HTTP formatting is done on web server 1202 through an extensible stylesheet language (XSL) transformation (XSLT)

by using, for example, an Microsoft® XML (MSXML) 4.0 processor. References to charts and maps are through image tags pointing back to the website. Charts in the industry report are dynamically generated by a commercially available component object module (COM) component executed on web server 1202 in response to an HTTP image request. The images are not stored on the file system of web server 1202, but streamed back to the browser immediately. Charting may be performed by ChartDirector available from Advanced Software Engineering Limited, which is headquartered in Kowloon, Hong Kong. Any other similar product may be used for small, file size, charts, such as bar graphs. The industry report includes a nationwide map for counts of headquarters locations. This map is generated by positioning the counts above slices of a static United States map. If the map does not work in some browsers, an HTML table listing the counts per region may be used instead.

Figure 13:
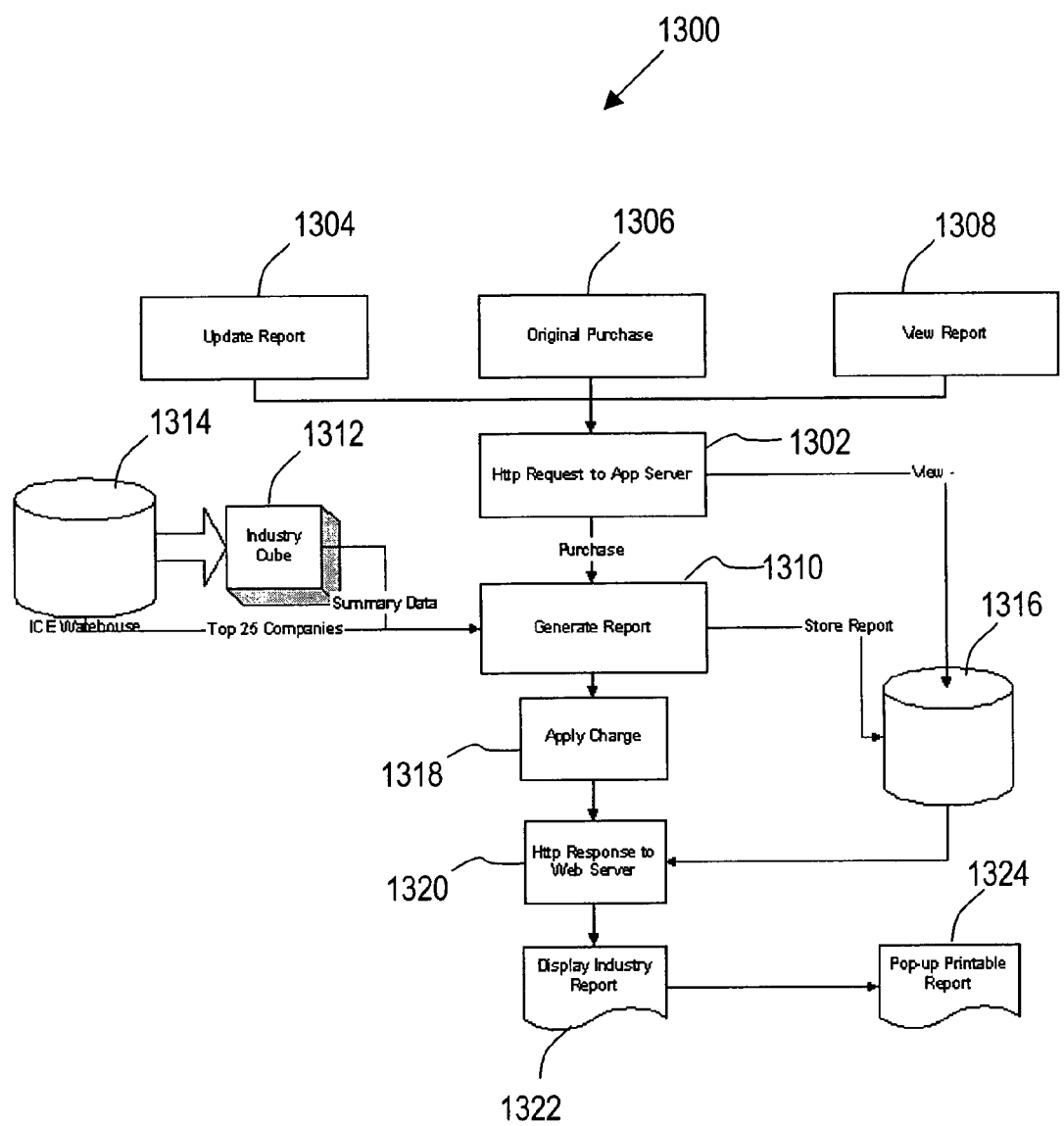
FIG. 13 is flow chart of another embodiment of a method of producing an industry report as one alternative to the method of FIG. 1.

FIG. 13 shows a method of producing an industry report 1300. There are three paths to an HTTP request to the application server 1302, by updating the industry report 1304, by the original purchase 1306, and by viewing the industry report 1308. After purchase, the industry report is generated 1310 with summary data from an industry cube 1312 and company information from an ICE warehouse 1314. Then, the industry report is stored in a storage device 1316 and a charge is applied 1318. Also, when application server 1302 fulfills an HTTP request to view the industry report, it accesses storage device 1316. Finally, there is an HTTP response to the web server 1320 from storage device 1316 and the industry report is displayed 1322, including a pop-up printable report 1324.

Method 1300 includes object-oriented software having a number of classes, such as a workflow class and a bizlogic class. A number of dynamic link libraries (DLLs) may also be included, such as one for small business operations (SBO) work flow or one for an application proxy, which is a portal class from web server 1202 to application server 1204. The workflow class includes a function to accept geography, six digit SIC, displayed price, user ID, item ID, and order ID. These are combined into XML format and posted to application server 1204. The combination tells a processor if user 1216 wants to look at the industry report, buy it, or re-purchase it. After processing in the SBO work flow DLL is finished, the function returns a string to an active server page (ASP) where it is parsed and displayed. Table 4 shows example XML posted from web server 1202 to application server 1204.

TABLE 4

Example XML

```
<IND_RPT_RQ>
    <USER_ID/>
    <RPT_ID/>
    <GEO Code="">
        <AREA/>
    </GEO>
    <SIC_6/>
    <DISP_PRICE/>
    <DEL_ITEM/>
    <CRC>
        <EMAIL></EMAIL>
        <USER_ID></USER_ID>
    </CRC>
</IND_RPT_RQ>
```

An industry report class is added to the SBO biz logic project. The industry report class has functions for HTTP requests to negotiate about window size (NAWS), creation of a storable XML string, and database access functions, such as storing and retrieving.

Method 1300 may also include the following example process steps.

1. Several transaction types are possible when the application server receives the XML from the web server.
    a. If no RPT_ID is present and GEO and SIC_6 are empty then the process fails.
    b. If no RPT_ID is present and GEO and SIC_6 are not empty then continue processing. Proceed to step 2.
    c. If a RPT_ID is present, check for GEO and SIC_6. If these tags are non-empty then continue processing. Proceed to step 2.
    d. If a RPT_ID is present and GEO is empty then get current stored report from the database. The function GetItem is used for this purpose. Proceed to step 6.
2. Once the geography and 6 digit SIC have been retrieved a series of HTTP requests are made to the NAWS database.
    a. Each request is synchronous in nature and if any step fails to return data or returns an error then the entire process fails and the user is not charged.
        i. The first request returns a list of the top 25 companies in the industry and the geographic area chosen by the user. Table 5 shows an example of the request.

TABLE 5

Example of the First Request

```
<DGX>
    <SIGNONMSGSRQV1>
        <SONRQ>
            <DTCLIENT>20001204160816</DTCLIENT>
            <USERID>doe</USERID>
            <LANGUAGE>ENG</LANGUAGE>
            <APPID>SBO</APPID>
            <APPVER>01.0</APPVER>
        </SONRQ>
    </SIGNONMSGSRQV1>
    <MKTGMSGSRQV1>
        <MKTGLSTTRNRQ>
            <TRNUID>6627F68F-C63A-11D4-9771-009027865C78</TRNUID>
            <MKTGLSTRQ>
                <DELV_REQS>
                    <DELV_MODE_CD>SYNC</DELV_MODE_CD>
                    <DELV_FMT_CD>XML</DELV_FMT_CD>
```

TABLE 5-continued

Example of the First Request

```
            <LANG>EN</LANG>
        </DELV_REQS>
        <MKTGLST>
            <RSLT>
                <NME>LKUP_INDUSTRY</NME>
            </RSLT>
            <FLTR>
                <WT:BooleanGroup
xmins:WT="http://www.dnb.com/WTCriteria">
                    <WT:ComparisonSelection>
                        <WT:Token>PRIM_SIC_8</WT:Token>
                        <WT:Operator>=</WT:Operator>
                        <WT:Value>01110000</WT:Value>
                    </WT:ComparisonSelection>
                    <WT:ComparisonSelection>
                        <WT:Token>CTRY_CODE</WT:Token>
                        <WT:Operator>=</WT:Operator>
                        <WT:Value>100</WT:Value>
                    </WT:ComparisonSelection>
                    <WT:ComparisonSelection>
                        <WT:Token>RGN_CD</WT:Token>
                        <WT:Operator>=</WT:Operator>
                        <WT:Value>1</WT:Value>
                    </WT:ComparisonSelection>
                    <WT:ComparisonSelection>
                        <WT:Token>MSA</WT:Token>
                        <WT:Operator>=</WT:Operator>
                        <WT:Value/>
                    </WT:ComparisonSelection>
                    <WT:ComparisonSelection>
                        <WT:Token>PRIM_GEO_AREA</WT:Token>
                        <WT:Operator>=</WT:Operator>
                        <WT:Value/>
                    </WT:ComparisonSelection>
                </WT:BooleanGroup>
            </FLTR>
        </MKTGLST>
    </MKTGLSTRQ>
  </MKTGLSTTRNRQ>
 </MKTGMSGSRQV1>
</DGX>
``` ii. The second request returns data describing the company's region and the national totals including annual sales, a national count of the companies in the industry and number of employees. Table 6 shows an example of the second request.

TABLE 6

Example of the Second Request

```
<DGX>
    <SIGNONMSGSRQV1>
        <SONRQ>
            <DTCLIENT></DTCLIENT>
            <USERID></USERID>
            <USEREMAIL></USEREMAIL>
            <LANGUAGE>ENG</LANGUAGE>
            <APPID>SBO</APPID>
            <APPVER>01.0</APPVER>
        </SONRQ>
    </SIGNONMSGSRQV1>
    <MKTGMSGSRQV1>
        <ANLYTRNRQ>
            <TRNUID></TRNUID>
            <ANLYRQ>
                <ANLY>
                    <UNVS>INDUSTRY</UNVS>
                    <MEAS>Count</MEAS>
                    <COLUMNS>
                        <LEVEL tag="IND_COUNT" code=""function=""/>
```

TABLE 6-continued

Example of the Second Request

```
                <LEVEL tag="IND_SUM_ANN_SALE_VOL" code=""
function=""/>
                <LEVEL tag="IND_SUM_TOT_EMPL_HERE" code=""
function=""/>
            </COLUMNS>
            <ROWS>
                <LEVEL tag="RGN_CD" code=""function="members"/>
                <LEVEL tag="CTRY_CODE" code="US" function=""/>
            </ROWS>
            <FLTR>
                <BOOL_GRP>
                    <CONJ>AND</CONJ>
                    <MBRP_SELN>
                        <LEVEL tag="PRIM_SIC_6" code=""
function=""/>
                        <VAL></VAL>
                    </MBRP_SELN>
                </BOOL_GRP>
            </FLTR>
          </ANLY>
        </ANLYRQ>
      </ANLYTRNRQ>
    </MKTGMSGSRQV1>
</DGX>
``` iii. The third and final request returns information about company aging across the industry grouped by number of years in business. Table 7 shows an example of the third request.

TABLE 7

Example of the Third Request

```
<DGX>
    <SIGNONMSGSRQV1>
        <SONRQ>
            <DTCLIENT>20001204160918</DTCLIENT>
            <USERID></USERID>
            <USEREMAIL></USEREMAIL>
            <LANGUAGE>ENG</LANGUAGE>
            <APPID>SBO</APPID>
            <APPVER>01.0</APPVER>
        </SONRQ>
    </SIGNONMSGSRQV1>
    <MKTGMSGSRQV1>
        <ANLYTRNRQ>
            <TRNUID></TRNUID>
            <ANLYRQ>
                <ANLY>
                    <UNVS>INDUSTRY</UNVS>
                    <MEAS>Count</MEAS>
                    <COLUMNS>
                        <LEVEL tag="YRS_IN_BUS_RNG" code=""
function="members"/>
                    </COLUMNS>
                    <ROWS>
                        <LEVEL tag="RGN_CD" code="1" function=""/>
                    </ROWS>
                    <FLTR>
                        <BOOL_GRP>
                            <CONJ>AND</CONJ>
                            <MBRP_SELN>
                                <LEVEL tag="PRIM_SIC_6" code=""
function=""/>
                                <VAL></VAL>
                            </MBRP_SELN>
                        </BOOL_GRP>
                    </FLTR>
                </ANLY>
```

TABLE 7-continued

Example of the Third Request

```
            </ANLYRQ>
        </ANLYTRNRQ>
    </MKTGMSGSRQV1>
</DGX>
```

3. New XML is created based on the three responses. This XML is in a format that the Industry Report can be created from.
    a. The new XML is created from the XML responses from NAWS and formed into a specific image for use on the ASP page.
        i. The CO tag is repeating in an example response.
4. Once the XML is created, it is inserted into the database as a single string in a single column.
    a. XML string, geography, and SIC are inserted into a database, ready to be retrieved and transformed by ASP.
    b. The function InsertItem is used for this purpose.
5. Charge user for report.
    a. This is the last part of the process; it only happens if all earlier functions do not fail.
5. XML is returned to the web server to be parsed and displayed for the user.

An example database for use in practicing the present invention includes a schema. An example industry report module has a database table and a small business operations (SBO) attribute table having attributes of the industry reports as shown in Table 8 and stored procedures as shown in Table 9.

TABLE 8

Example Attributes of the Industry Reports

```
SBO_ITEM_ATTRIBUTE TABLE:
    This table contains attributes for Industry Reports.
    Columns:
        item_nbr
            Int not null
            Item_nbr from sbo_item.
        seq nbr:
            Int not null
            Unique identifier when combined with item_nbr.
        attribute_name:
            Varchar (50) not null
            This is the name of the attribute.
        attribute_value:
            Varchar (255) not null
            This is the value of the attribute.
```

TABLE 9

Example Stored Procedures

```
New Stored Procedures.
    SboInsertItemAttribute:
        This inserts an attribute into the sbo_item_attribute table.
    SboGetItemAttribute:
        This retrieves all attributes for a specific item_nbr.
```

Another embodiment of the present invention includes transaction logging. Transaction logging functionality is implemented in a visual basic (VB) class named CuserTrnasactionInfo. This class provides timing, transaction ID (global unique identifier or GUID) generation, user and super user ID containers, configuration holding, tracing, exception reporting, and transaction logging. Each public method in a workflow layer creates the instance of this class and sets the appropriate properties. Each method in a business logic layer takes an instance of this class as a parameter, for use with logging, timing, tracing, etc. Certain methods (mainly in a data access layer) create sub-transactions to track transactions to external systems, database calls, etc. Table 10 shows helpful properties/methods of the CtransactionInfo class.

TABLE 10

Helpful properties/methods of the CtransactionInfo Class

| Property | Description |
| --- | --- |
| Transaction Unique Identifier. (TransactionUID) | The GUID used to uniquely track a transaction. This is used in the various SBS, SearchMart and IWS web logs, transaction logs to track a transaction across multiple layers. |
| Parent Transaction Unique Identifier. (ParentTRNUID) | If this is a "sub-transaction" the ID of the parent txn. This is used to group transactions together as a batch of transactions set off from a single parent transaction. This allows transactions to be grouped by batch process. |
| Status | 0 = success, otherwise, the error # |
| Transaction code | Code number for transaction type. |
| TransactionType | e.g., Lookup, Match, GetEvaluatorPacket, PurchaseEvaluator, AddItem, AddUser, AddCreditCard, GetProximityCount, GetIndustryCount, GetUserInfo, GetUserBillHistory, etc. |
| StartTime | In GMT |
| EndTime | In GMT |
| IP address and Host Name | IP & Host name of Transaction server |
| Process Id | |
| Process Name | Name of the script or procedure that generated the log. |
| User ID | |
| Super User ID | If a super-user is initiating the transaction |
| Parameters | For instance, search parms, or DUNS #, SIC codes, etc |
| Partner | Partner ID (1, 2, 3, etc - not SBS, QB, QBIAP) |
| Time Zone | |
| Server Name | |
| Transaction Component | |
| Transaction Application | |
| Error severity (if any) | Severity of any error that occurs |
| Error source (if any) | Source of any error that occurs |
| Transaction message | |
| Records Processed | The number of records processed by this transaction |
| EntryPoint | The spot in code the transaction began (i.e., ASP page name, XML API, or batch program) |

It is to be understood that the above description is intended to be illustrative and not restrictive. Many other embodiments will be apparent to those of skill in the art upon reviewing the above description, including implementation in languages other than visual basic, protocols other than ICE, XML, or HTTP, storage devices other than databases, and other similar differences. The present invention has applicability to applications outside the business information industry. Therefore, the scope of the present invention should be determined with reference to the appended claims, along with the full scope of equivalents to which such claims are entitled.

What is claimed is:

1. A system for generating an industry report, said system comprising:
   an application server;
   a memory having data stored therein;
   a display; and
   a web server that processes a request from said application server for a fabricated data product based on said data, wherein said fabricated data product is prepared in accordance with a user making a selection from a set of options that includes a new report, a report for an industry that is similar to another industry, and a report selected from a company information page,
   wherein said application server:
   (a) evaluates whether said fabricated data product includes information about a desired industry, and proceeds according to the following rules:
      if said fabricated data product does not include information about said desired industry, then said application server prompts a user to conduct an industry keyword search of said data until said information about said desired industry is found, else
      if said fabricated data product does include said information about said desired industry, then said application server prompts said user to select a geographical region, and thereafter
   (b) evaluates whether a number of companies in said geographical region satisfies a predetermined threshold, and proceeds according to the following rules:
      if said number of companies in said geographical region does not satisfy a predetermined threshold, then said application server prompts said user to alter said geographical region until said predetermined threshold is met, else
      if said number of companies in said geographical region meets said predetermined threshold, then said application server prompts said user to confirm a purchase of said industry report, wherein said industry report is stored into said memory and presented on said display.

* * * * *